(12) United States Patent
Imashiro et al.

(10) Patent No.: US 6,607,817 B1
(45) Date of Patent: Aug. 19, 2003

(54) MELAMINE RESIN FOAM WITH EXCELLENT OIL REPELLENCY

(75) Inventors: Yasuo Imashiro, Chiba (JP); Shun Hasegawa, Chiba (JP); Takahiko Matsumoto, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/542,276

(22) Filed: Apr. 4, 2000

Related U.S. Application Data

(63) Continuation-in-part of application No. 09/011,040, filed as application No. PCT/JP97/02077 on Jun. 17, 1997, now abandoned.

(30) Foreign Application Priority Data

Jun. 18, 1996 (JP) .............................. 8-178652

(51) Int. Cl.$^7$ .............................. B32B 27/00
(52) U.S. Cl. .............................. 428/319.3; 428/308.4; 428/422; 521/136; 521/137; 521/181; 521/187
(58) Field of Search .............................. 428/308.4, 319.3, 428/422; 521/136, 137, 181, 187

(56) References Cited

U.S. PATENT DOCUMENTS

| | | | | |
|---|---|---|---|---|
| 4,284,746 A | * | 8/1981 | Ohmori | 525/510 |
| 4,334,971 A | * | 6/1982 | Mahnke et al. | 204/159.21 |
| 4,374,889 A | * | 2/1983 | Arens | 428/207 |
| 5,182,163 A | * | 1/1993 | Wheat et al. | 428/304.4 X |
| 5,209,965 A | * | 5/1993 | Caldwell | 428/306.6 X |
| 5,296,511 A | * | 3/1994 | Ohsawa et al. | 522/33 |
| 5,371,155 A | * | 12/1994 | Kobayashi | 525/477 |
| 5,405,929 A | * | 4/1995 | Kobayashi | 528/15 |
| 5,413,853 A | * | 5/1995 | Imashiro et al. | 428/308.4 |
| 5,436,278 A | * | 7/1995 | Imashiro et al. | 521/187 |
| 5,506,047 A | * | 4/1996 | Hedrick et al. | 428/307.7 |
| 5,514,726 A | * | 5/1996 | Nichols et al. | 521/152 |
| 5,684,074 A | * | 11/1997 | Hirashima et al. | 524/265 |
| 5,824,421 A | * | 10/1998 | Kobayashi et al. | 428/412 |

FOREIGN PATENT DOCUMENTS

| | | |
|---|---|---|
| JP | 1-304936 A | 12/1989 |
| JP | 5-318679 A | 12/1993 |
| JP | 7-26054 A | 1/1995 |
| JP | 9-104772 A | 4/1997 |
| JP | 1-304936 A | 12/1999 |

* cited by examiner

*Primary Examiner*—Terrel Morris
*Assistant Examiner*—Leanna Roché
(74) *Attorney, Agent, or Firm*—Kubovcik & Kubovcik

(57) ABSTRACT

A melamine resin foam endowed with excellent oil repellency and which is improved in fragility without deteriorating the superior properties inherently possessed by melamine resin foams. The melamine resin foam with excellent oil repellency is obtained by coating an oleophobic component on a base material produced by foaming a resin composition comprising, as the main components, a melamine-formaldehyde condensate and a foaming agent.

6 Claims, 1 Drawing Sheet

MELAMINE RESIN FOAM WITH EXCELLENT OIL REPELLENCY

This application is a continuation-in-part of application Ser. No. 09/011,040, filed Feb. 6, 1998 now abandoned, which, in turn, is the national stage in the United States of PCT/JP97/02077 filed Jun. 17, 1997.

TECHNICAL FIELD

The present invention relates to a melamine resin foam. More particularly, the present invention relates to a melamine resin foam with excellent oil repellency, which is improved in oil repellency and consequently can be suitably used as a sound-insulating material or a heat-insulating material for various applications, particularly those where the foam is exposed to oil over a long period of time.

BACKGROUND ART

As well known, melamine-formaldehyde resins are a thermosetting resin and an amino resin, obtained by the reaction of melamine with formaldehyde, and those of high molecular weight are in use as heat-resistant tableware, surface plate of table, etc. for their excellent heat resistance.

It is also known that melamine-formaldehyde resin foams exhibit excellent flame retardancy as compared with other organic resin foams and further have excellent sound-insulating property and heat-insulating property. Therefore, use of melamine resin foams as a construction material, or as a sound- and heat-insulating material in automobiles, industrial machinery, factories, etc. is expected.

Melamine resin foams, however, have various problems. That is, they are very fragile and the fragility is striking when they have a high expansion ratio; having very high water absorbability, they show property deterioration due to moisture absorption and adverse effects to the surrounding members when used as a construction material, a sound-insulating material, etc.; when used for industrial applications as a heat insulating material or the like, they may invite substantial reduction in flame retardancy due to oil absorption. Thus, melamine resin foams have had limited applications.

In order to alleviate the above-mentioned problems of melamine resin foams, of property deterioration due to moisture absorption and adverse effects to the surrounding members, there was proposed, in JP-A-7-26054, a method of endowing a melamine resin foam with water repellency using a silicone resin. However, no melamine resin foam endowed with oil repellency has been provided heretofore.

The object of the present invention is to alleviate the above-mentioned problems of the prior art and provide a melamine resin foam endowed with excellent oil repellency and which is improved in fragility without deteriorating the superior properties (e.g. sound-insulating property) inherently possessed by melamine resin foams.

Disclosure of the Invention

According to the present invention, there is provided a melamine resin foam with excellent oil repellency, obtained by coating an oleophobic component on a base material produced by foaming a resin composition comprising, as the main components, a melamine-formaldehyde condensate and a foaming agent.

The present inventors made a study with an idea that when a melamine resin foam is coated with an oleophobic component, the melamine resin foam may be endowed with oil repellency and moreover may be improved in fragility when a load is applied thereto, because the coated oleophobic component may disperse the load and may reduce the destruction of the skeleton of the foam. As a result, the present invention has been completed.

Best Mode for Carrying Out the Invention

Figure 1A:
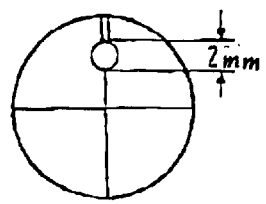
FIGS. 1 (a)–(i) illustrates the steps of the method for measuring the contact angle with hexadecane of the melamine resin foam of the present invention.

The present invention is hereinafter described in detail.

As described above, the melamine resin foam of the present invention can be obtained by coating an oleophobic component on a known melamine resin foam (a base material) produced by foaming a resin composition comprising a melamine-formaldehyde condensate and a foaming agent as the main components. Therefore, in production of the present melamine resin foam, there can be used, except for the oleophobic component, various components ordinarily used in production of melamine-formaldehyde resin or its foam.

The melamine-formaldehyde condensate can be obtained by mixing melamine, formalin and paraformaldehyde and reacting them in the presence of an alkali catalyst with heating. The mixing ratio of melamine and formaldehyde can be, for example, 1:3 (melamine:formaldehyde) in terms of molar ratio.

The thus-obtained melamine-formaldehyde condensate has a viscosity of preferably 1,000–100,000 cp, more preferably 5,000–15,000 cp, and a pH of preferably 8–9.

The foaming agent can be, for example, a straight-chain alkyl hydrocarbon. Use of pentane or hexane is particularly preferable.

In order to obtain a base material which is uniformly foamed, it is possible to add an emulsifier to the resin composition comprising a melamine-formaldehyde condensate and a foaming agent as the main components. Such an emulsifier includes, for example, a metal alkylsulfonate and a metal alkylarylsulfonate. Use of sodium dodecylbenzenesulfonate is preferable.

To the resin composition may be added a curing agent in order to cure the foamed resin composition. Such a curing agent includes, for example, an acidic curing agent. Use of formic acid, hydrochloric acid, sulfuric acid or oxalic acid is preferable.

The base material used in the present invention can be obtained by adding as necessary, to the resin composition comprising a melamine-formaldehyde condensate and a foaming agent as the main components, an emulsifier, a curing agent, a filler, etc., heating the mixture at a temperature not lower than the boiling point of the foaming agent to give rise to foaming, and curing the resulting foam. Incidentally, the process for production of the base material is described in, for example, JP-A-55-142628 and JP-A-56-152848.

The base material used in the present invention may be an isocyanate-modified melamine resin foam. The process for production of such a foam is described in, for example, JP-A-7-157590.

The thus-obtained base material preferably has substantially open cells because an oleophobic component is coated on the skeleton of the base material as described later.

The oleophobic component used in the present invention has no particular restriction and can generally be any commercial substance having oleophobicity. The oleophobic component is preferably, a fluororesin typified by a teflon resin.

The fluororesin used as an oleophobic component in the present invention includes those having not only oleophobicity but also hydrophobicity. When such a fluororesin is used, the melamine resin foam of the present invention can have not only oil repellency but also water repellency.

When the fluororesin is coated on the base material in the form of an aqueous emulsion, various advantages are obtained with respect to the exhaust gas treatment, drying, solvent recovery, etc. conducted in the coating and drying steps. Particularly when the fluororesin is coated on the surface of the base material skeleton in the form of an aqueous emulsion, above advantages are obtained more effectively.

In the present invention, the oleophobic component is coated on the base material as follows, for example. That is, the base material is immersed in a treating solution containing the oleophobic component to impregnate the treating solution deep into the base material; the base material is taken out of the treating solution; the excessive portion of the treating solution is removed by natural falling or by uniform squeezing using a roller, a press or the like; and the base material is dried. Incidentally, the above impregnation may be conducted by allowing the base material to stand in the treating solution for several hours or by subjecting the base material to repeated compression and pressure release in the treating solution to forcibly remove the air present in the base material (this latter approach can complete impregnation in a shorter time).

In the thus-obtained melamine resin foam with excellent oil repellency according to the present invention, there is no deterioration of superior properties (e.g. sound-insulating property etc.) inherently possessed by melamine resin foams.

Therefore, the present melamine resin foam can be used as a sound- and heat-insulating member of automobiles, industrial machinery, etc., or as a sound-insulating panel of machines.

Further, having oil repellency, the present melamine resin foam can prevent adhesion of scattered oil, etc. thereto and can substantially prevent reduction in flame retardancy.

In a preferred embodiment of the present invention, the melamine resin foam is coated with a fluororesin such that the foam has excellent oil repellency as characterized by a contact angle with hexadecane of not less than 90° and, preferably, not less than 110°, and an oxygen index of not less than 20.0% and, preferably, not less than 27.5%. The foam coated with a fluororesin maintains its fire retardancy even after prolonged use in an oil-rich environment.

When the melamine resin foam of the present invention is used as, for example, a sound- and heat-insulating member of automobiles, industrial machinery, etc., it can be used in combination with various film materials (in this case, the sound-insulating property of the melamine resin foam can be varied depending upon the property of the film material used). The present melamine resin foam can also be used as a self-supporting sound-insulating panel, for example, a sound-insulating panel used in the sides or surroundings of roads, railroads, stadiums, etc., in a form covered with, for example, a perforated panel (e.g. a perforated iron or aluminum sheet).

The present melamine resin foam, when using an oleophobic and hydrophobic fluororesin as the oleophobic component, can prevent property deterioration caused by dew condensation or moisture absorption, owing to the hydrophobicity.

The sound-insulating panel for use in the sides or surroundings of roads, railroads, stadiums, etc. is used outdoor and comes into contact with moisture in air and/or scattered oil. However, the panel, when using an oleophobic and hydrophobic fluororesin as the oleophobic component, possesses both water repellency and oil repellency and can prevent property deterioration caused by water absorption and oil absorption.

The melamine resin foam of the present invention having both water repellency and oil repellency can also be used as a sound-insulating material or a heat-insulating material in homes in the ventilating duct, ventilating fan and kitchen, and can prevent reduction in flame retardancy or property deterioration, caused by scattered oil, moisture, steam, etc.

In the above case, the melamine resin foam of the present invention can be used by itself or by lamination with a surface material (e.g. wallpaper), or can be combined with a construction material board or the like to use as a sound- and heat-insulating panel.

As described above, the melamine resin foam of the present invention has is light weight and has good processability and accordingly can be easily combined with various other materials; therefore, can be used in various applications in various forms, which is one feature of the present melamine resin foam.

The present invention is described specifically below by way of Examples. The Examples, however, are only for illustration and do not in any way restrict the scope of the present invention.

EXAMPLES 1 and 2

Into a commercial melamine resin foam having open cells [Basotect (trade name) produced by BASF, having a bulk density of 11 kg/m$^3$] was impregnated a fluororesin [FX 845 (product No.) of Sumitomo 3M Limited] in an amount shown in Table 1. Then, there were conducted uniform squeezing with a roller and subsequent drying at 100° C. for 2 hours to obtain foamed materials. Each foamed material had properties shown in Table 1.

EXAMPLE 3

Melamine and formaldehyde were mixed at a molar ratio of 1:3, followed by adjusting a solid portion to 80%. Thereto was added 2 N of sodium hydroxide as a catalyst. The mixture was reacted at 120° C. for 50 minutes to obtain a melamine-formaldehyde condensate having a final resin concentration of 76% and a viscosity of 12,000 cp. To 100 parts by weight of this condensate were added 6.3 parts by weight of an aqueous solution containing 30% of sodium dodecylbenzenesulfonate, 11.4 parts by weight of pentane, 9.5 parts by weight of ammonium chloride, 2.7 parts by weight of formic acid and 7.6 parts by weight of CR 200 (polymeric-4,4-diphenylmethane duisocyanate produced by Mitsui Toatsu Chemicals, inc.). The resulting mixture was foamed in an oven of 100° C. to obtain a melamine resin foam. The foam had a bulk density of 27 kg/M$^3$. Into the foam was impregnated a fluororesin [FX 845 (product No.) of Sumitomo 3M Limited] in an amount shown in Table 1. Then, there were conducted uniform squeezing with a roller and subsequent drying at 100° C. for 2 hours, to obtain a foamed material. The foamed material had properties shown in Table 1.

TABLE 1

|  | Example 1 | Example 2 | Example 3 |
|---|---|---|---|
| Bulk density (kg/m$^3$) | 13.0 | 16.0 | 32.0 |
| Amount of teflon resin impregnated (kg/m$^3$) | 2.0 | 5.0 | 5.0 |
| Water repellency (degree) | 138 | 139 | 138 |
| Water absorption (%) | 2.7 | 2.6 | 2.8 |
| Oil repellency (degree) | 134 | 134 | 133 |
| Oil absorption (%) | 3.5 | 3.5 | 3.5 |
| Tensile strength (kg/cm$^2$) | 1.5 | 1.5 | 1.7 |
| Elongation (%) | 23 | 25 | 28 |
| Oxygen index (%) | 30.5 | 29.5 | 27.5 |

Tensile strength and elongation were measured according to JIS K 6301. Water absorption and oil absorption were measured according to DIN 53433; that is, water absorption was measured by immersing a test piece in water and using the following formula:

Water absorption (%)=[test piece weight after immersion (g)−test piece initial weight (g)]/test piece initial volume (cm$^3$)×100

Oil repellency and water repellency were measured by way of contact angle according to a droplet method. Oxygen index was measured according to JIS K 7201-2. (The same applies also to Examples which follow.)

EXAMPLE 4

Into the same melamine resin foam as used in Example 1 was impregnated a fluororesin emulsion [FC 807 (product No.) of Sumitomo 3M Limited] in an amount shown in Table 2. Then, there were conducted uniform squeezing with a roller and subsequent drying at 100° C. for 2 hours, to obtain a foamed material. The foamed material had properties shown in Table 2.

EXAMPLE 5

Into the same melamine resin foam as used in Example 1 was impregnated a fluororesin emulsion [FC 808 (product No.) of Sumitomo 3M Limited] in an amount shown in Table 2. Then, there were conducted uniform squeezing with a roller and subsequent drying at 100° C. for 2 hours, to obtain a foamed material. The foamed material had properties shown in Table 2.

Comparative Example 1

The properties of the same melamine-formaldehyde resin foam as used in Example 1 are shown in Table 2.

TABLE 2

|  | Example 4 | Example 5 | Comp. Exa. 1 |
|---|---|---|---|
| Bulk density (kg/m$^3$) | 15.0 | 16.0 | 11.0 |
| Amount of teflon resin impregnated (kg/m$^3$) | 5.0 | 5.0 | — |
| Water repellency (degree) | — | 139 | — |
| Water absorption (%) | >90 | 2.6 | >90 |
| Oil repellency (degree) | 133 | 134 | — |
| Oil absorption (%) | 3.2 | 3.6 | >90 |
| Tensile strength (kg/cm$^2$) | 1.5 | 1.5 | 1.5 |
| Elongation (%) | 24 | 21 | 15 |
| Oxygen index (%) | 31.0 | 30.5 | 32.0 |

Example of Long Term Exposure to an Oil-Rich Environment

The following data demonstrate the remarkable oil repellancy provided to a melamine resin foam when coated with a fluororesin:

Samples:

The samples were:

1) The melamine foams of Examples 1 and 2 of the present invention coated with a fluororesin and the uncoated melamine-formaldehyde foam of Comparative Example 1 of the present application, and 2) The melamine foams of Examples 1, 3 and 4 of Imashiro et al., U.S. Pat. No. 5,413,853, coated with a silicone resin emulsion.

Procedure

Each sample was adhered to the periphery of a hydraulic pump in a hydraulic press and allowed to stand for 1 year. After 1 year, dust and oil smudges were observed on the surface of each sample. The dust and oil smudges on the surface of each sample were removed by an air-shower. As compared with the samples of Examples 1 and 2 of the present application, the sample of Comparative Example 1 of the present application, as well as the samples of Examples 1, 3 and 4 of the Imashiro et al. patent show a pale-black appearance which means that oil of the hydraulic pump has soaked into the samples.

Each of the samples were measured for contact angle with hexadecane and oxygen index. The results are shown in Table 3 below.

TABLE 3

|  | Contact Angle (°)* | | Oxygen Index (%)** | |
|---|---|---|---|---|
|  | Before test | After test | Before test | After test |
| Present Invention | | | | |
| Example 1 | 110 | 112 | 30.5 | 28.5 |
| Example 2 | 115 | 109 | 29.5 | 27.5 |
| Comp. Example 1 | — | — | 32.0 | 13.0 |
| Imashiro et al. | | | | |
| Example 1 | 56 | — | 23.0 | 16.0 |
| Example 3 | 53 | — | 24.5 | 16.5 |
| Example 4 | 38 | — | 24.5 | 15.0 |

— unable to measure
**Measurement of contact angle

The contact angle with hexadecane was measured using a Face contact angle meter type CA-DT.A produced by Kyowa-Kaimen-Kagaku according to the titration procedure illustrated in FIGS. 1(a)–(i) and comprising the following steps:

(FIG. 1(a)) A micrometer of the equipment prepared for measuring the contact angle was turned so that the volume of hexadecane is adjusted and a drop of the hexadecane is formed on a point of a needle. The drop preferably has a diameter of less than 2 mm.

Figure 1B:
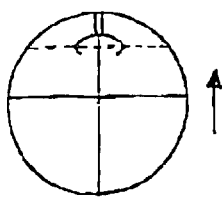

(FIG. 1(b)) The surface of the sample is moved upwardly so that the drop of the hexadecane comes into contact with the surface of the sample, then the surface of the sample is moved downwardly to the original position. The drop is removed from the point of the needle.

Figure 1C:
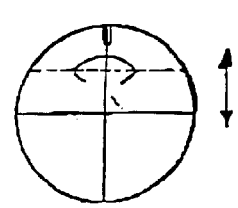

(FIG. 1(c)) The position of the drop is adjusted.

Figure 1D:
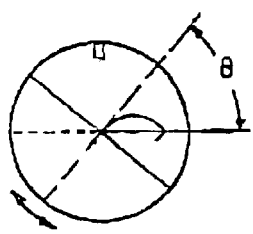

(FIG. 1(d)) A 2-d adjustable cross-ring is operated to make a tangent to the drop, and its angle is measured by a protractor for a contact angle.

Figure 1E:
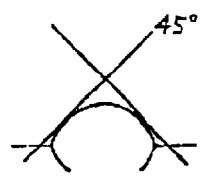
Figure 1F:
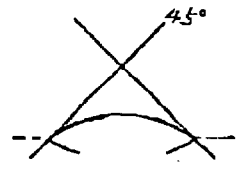

(FIGS. 1(e) and (f)) Otherwise, the adjustable cross-ring is adjusted to 45°, and set to i) a line contacting the drop horozontally (FIG. 1(e)), or ii) a contacting point between the drop and the surface of the solid sample (FIG. 1(f)).

Figure 1G:
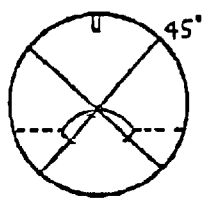

(FIG. 1(g)) From the position as illustrated in (FIGS. 1(e) and (f)), the surface of the solid sample is moved upwardly and vertically, to find the apex.

Figure 1H:
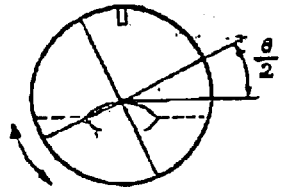
Figure 1I:
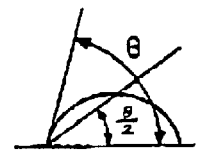

(FIGS. 1(h) and (i)) The angle formed by a line connecting the apex and the left contacting point between the drop and the surface of the solid sample is measured for a contact angle/2, which is converted to a contact angle by doubling.

Oxygen index was measured according to JIS K 7201-2.

Conclusions

As shown in the above table, in the sample of Comparative Example 1 of the present application and the samples of the Imashiro et al. patent, the contact angle and the oxygen index were decreased due to absorption of oil of the hydraulic pump. The samples of Examples 1 and 2 of the present application, on the other hand, show substantially no change in the contact angle and the oxygen index. This means that the melamine foam of Examples 1 and 2 of the present application coated with a fluororesin are capable of maintaining excellent oil repellency for a long term, and accordingly, are especially suitable for use in an oil-rich environment over a long term without reducing oil repellency.

INDUSTRIAL APPLICABILITY

The melamine resin foam of the present invention, the surface of which skeleton is coated with an oleophobic component, shows low oil absorption and accordingly substantially no reduction in flame retardancy, caused by oil adhesion. While conventional melamine resin foams are inherently fragile and, when deformed by compression or the like, cause skeletal destruction and consequent detachment of resin fine particles, the melamine resin foam of the present invention, the surface of which skeleton is coated with an oleophobic component, shows lower skeletal destruction owing to the dispersion of applied load and, even when destructed, causes no detachment of resin particles.

The melamine resin foam of the present invention, when the fluororesin component has not only oleophobicity but also hydrophobicity, can avoid property deterioration caused by dew condensation and moisture absorption because the foam has water repellency.

Accordingly, the melamine resin foam of the present invention, which has the above-mentioned properties, can be used, for example, as a construction material, or as a sound- and heat-insulating material for various applications such as automobiles, industrial machinery and the like.

What is claimed is:

1. A melamine resin foam with excellent oil repellency obtained by providing a coating consisting of a fluororesin having hydrophobicity and oleophobicity on a base material produced by foaming a resin composition comprising, as the main components, a melamine-formaldehyde condensate and a foaming agent, said foam having a contact angle with hexadecane of not less than 90°.

2. A melamine resin foam with excellent oil repellency according to claim 1, wherein the base material has substantially open cells.

3. A melamine resin foam with excellent oil repellency according to claim 2, wherein the base material is coated with the fluororesin at the surface of its skeleton.

4. A melamine resin foam with excellent oil repellency according to claim 1, wherein the fluororesin is coated on the base material in the form of an aqueous emulsion.

5. A melamine resin foam with excellent oil repellency obtained by providing a coating consisting of a fluororesin on a base material produced by foaming a resin composition comprising, as the main components, a melamine-formaldehyde condensate and a foaming agent, said foam having a contact angle with hexadecane of not less than 90° and an oxygen index of not less than 20%.

6. A melamine resin foam with excellent oil repellency according to claim 5, wherein the contact angle with hexadecane is not less than 110° and the oxygen index is not less than 27.5%.

* * * * *

UNITED STATES PATENT AND TRADEMARK OFFICE
CERTIFICATE OF CORRECTION

PATENT NO.    : 6,607,817 B1                                                              Page 1 of 1
DATED         : August 19, 2003
INVENTOR(S)   : Yasuo Imashiro et al.

It is certified that error appears in the above-identified patent and that said Letters Patent is hereby corrected as shown below:

<u>Title page,</u>
Item [56], References Cited, FOREIGN PATENT DOCUMENTS, delete "JP 1-304936 A 12/1999".

Signed and Sealed this

Twenty-third Day of December, 2003

JAMES E. ROGAN
*Director of the United States Patent and Trademark Office*